(12) United States Patent
Price

(10) Patent No.: US 6,435,332 B1
(45) Date of Patent: Aug. 20, 2002

(54) CONVEYOR MODULE FOR SIMULTANEOUS TRANSLATION AND ROTATION OF PRODUCTS

(75) Inventor: Mark A. Price, New Richmond, WI (US)

(73) Assignee: SIG Pack, Inc., Doboy Division, New Richmond, WI (US)

( * ) Notice: Subject to any disclaimer, the term of this patent is extended or adjusted under 35 U.S.C. 154(b) by 117 days.

(21) Appl. No.: 09/706,107

(22) Filed: Nov. 3, 2000

(51) Int. Cl.$^7$ ............................................. B65G 47/24
(52) U.S. Cl. ...................................... 198/375; 198/416
(58) Field of Search ................................. 198/375, 410, 198/411, 415, 416, 417, 688.1, 817

(56) References Cited

U.S. PATENT DOCUMENTS

| | | |
|---|---|---|
| 2,643,778 A | 6/1953 | Socke |
| 2,864,281 A | 12/1958 | Draper |
| 3,121,362 A | 2/1964 | Shepherd et al. |
| 3,187,876 A | 6/1965 | Simpson |
| 3,215,250 A | 11/1965 | Schubert |
| 3,366,221 A | 1/1968 | Preisig |
| 3,783,991 A | 1/1974 | McCahon et al. |
| 3,847,273 A | 11/1974 | Buhayar |
| 4,085,839 A | 4/1978 | Crawford |
| 4,246,300 A | 1/1981 | Jensen |
| 4,672,792 A | 6/1987 | Wallin |
| 4,807,739 A | 2/1989 | Wolf et al. |
| 5,518,103 A | 5/1996 | Achelpohl et al. |
| 6,044,949 A | 4/2000 | Monsees |
| 6,045,493 A | 4/2000 | Totani |
| 6,290,053 B1 * | 9/2001 | Capovali et al. ............ 198/416 |

* cited by examiner

Primary Examiner—Kenneth W. Noland
(74) Attorney, Agent, or Firm—Nikolai & Mersereau, P.A.; Thomas J. Nikolai

(57) ABSTRACT

A conveyor module adapted to receive products thereon for translating and simultaneously rotating the product 90° in going from its infeed end to its outfeed end. An endless chain is deployed about spaced-apart sprocket wheels, one at the infeed end and one at the outfeed end and a plurality of product support plates are linked to the chain by a coupler that permits rotation of the support plate about an axis that is perpendicular to the support plate. The support plate carries a cam follower that is adapted to engage a cam track that is configured to impart the 90° rotation to the support plate as the endless chain carries the support plate between the infeed end and the outfeed end.

9 Claims, 6 Drawing Sheets

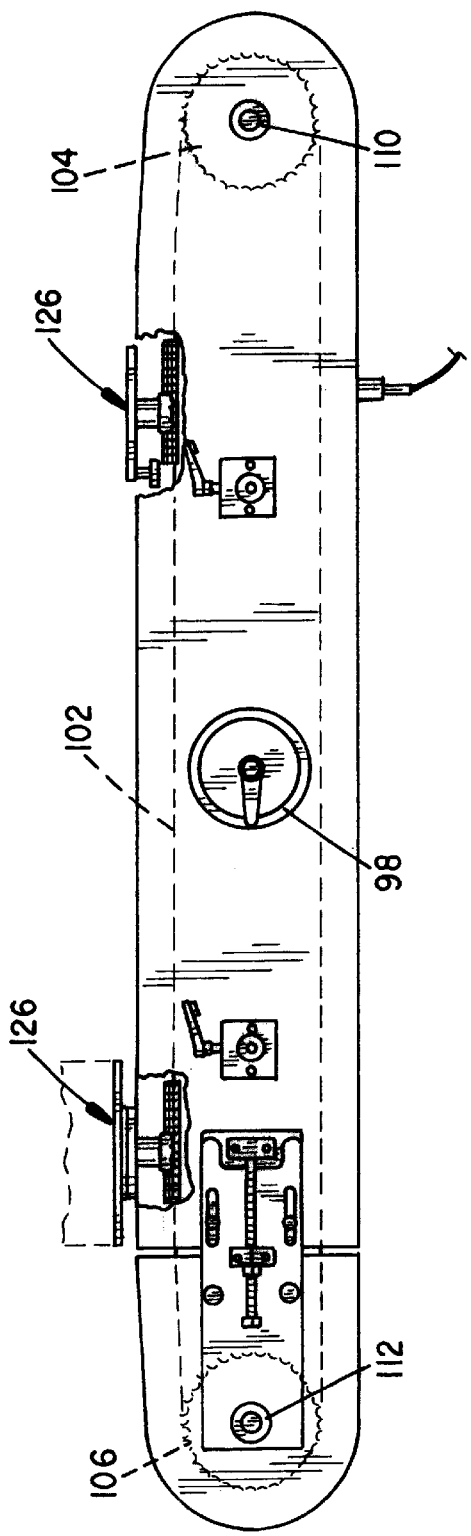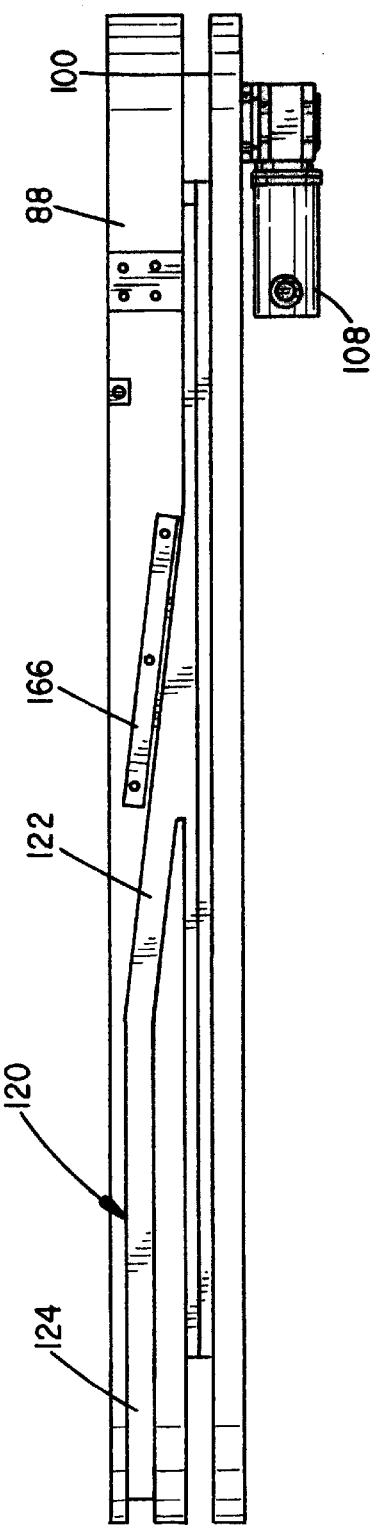

CONVEYOR MODULE FOR SIMULTANEOUS TRANSLATION AND ROTATION OF PRODUCTS

BACKGROUND OF THE INVENTION

I. Field of the Invention

This invention relates generally to a conveyor system for use in a carton forming and sealing machine, and more particularly to a conveyor module capable of rotating the carton by 90° while translating it from a first sealing station to a second sealing station.

II. Discussion of the Prior Art

In a carton forming and sealing machine, a flat blank of cardboard or paper board is first driven by a ram through a die to create a rectangular box configuration, the box having a bottom surface integrally joined to opposed side walls and end walls and a lid that is hinged along a top edge of one of the side walls.

These partially finished cartons may then have the product to be packaged placed therein and, subsequently, the box may be sealed in a two-stage gluing operation. At a first, upstream gluing station, a first tab comprising a folded extension of the lid beyond a mating side wall is adhesively bonded to that side wall. At a second, downstream gluing station, second and third tabs comprising extensions of the two side edges of the lid beyond the mating end walls of the box are adhesively bonded to the end walls of the box.

In fabricating the carton, a first overhead endless chain sweep conveyor or a conveyor having suitably spaced lugs on a conveyor chain may be used to translate the partially completed carton with the product therein past a hot glue gun at the first gluing station where a bead of glue is applied to the side wall surface to which the first extension tab of the lid is to be affixed. The sweep conveyor then urges the carton past a plow member which forces the first tab on the lid against the glue surface for a length of time sufficient to cause the glue to harden.

Before the second and third tabs comprising the extension of the two side edges of the lid can be glued to the mating end walls of the carton, the carton must first be rotated 90° so that the end walls will then be oriented parallel to the direction of travel of the conveyor, allowing a pair of glue guns to apply beads of glue to the opposites end walls as they move past the glue guns. Again, plow members downstream of the glue guns are used to urge the second and third extension tabs against their respective end walls of the box as the carton is carried forward by a downstream sweep conveyor.

It is the principal object of the present invention to provide an improved conveyor module capable of receiving a partially sealed carton from an upstream gluing station and for transporting the carton to a downstream gluing station while simultaneously rotating the carton by 90°.

SUMMARY OF THE INVENTION

The conveyor module constructed in accordance with the present invention is operative to rotate products while in transit there along. The conveyor module comprises a frame having first and second sprocket wheels journaled for rotation on the frame about first and second, horizontal, parallel, spaced-apart axes, respectively. An endless chain spans the first and second sprocket wheels to define upper and lower chain flights. A generally rectangular carton support plate having upper and lower major surfaces is affixed to a first shaft at the center point of the lower major surface. The support plate further includes a cam follower on a second shaft that is affixed to the lower major surface and which is laterally offset from the first shaft along a midline of the rectangular support plate to the endless chain. The first shaft is secured by a coupler member so as to permit the support plate and first shaft to rotate about a longitudinal axis of the first shaft. The frame also supports a cam track where the cam track includes a first segment that is parallel to the upper chain flight over a first predetermined distance and which converges toward and intersects with the upper chain flight in a direction of travel of the upper chain flight. The aforementioned cam follower is adapted to engage the cam track to impart rotation of the support plate with the first shaft as the cam follower traverses the cam track.

An additional cam track is supported on the frame and it includes a first segment that diverges away from the lower chain flight at a predetermined angle and is joined to a second segment that extends parallel to the lower chain flight in the direction of travel of the lower chain flight. Means are disposed adjacent the first segment of the additional cam track for causing the cam follower to traverse the first segment of the additional cam track to cause a return rotation of the support plate.

To aid in holding the carton being fabricated to the support plate during its transport and rotation by the conveyor module, it may prove expedient to utilize a vacuum source that is pneumatically coupled to the support plate on which the partially fabricated carton is carried. To this end, the first shaft may be tubular and the support plate may include a cavity in fluid communication with the lumen of the tubular shaft. By providing an apertured pattern in the support plate and by operatively coupling the vacuum source to the lower end of the tubular shaft as it traverse the conveyor module, the carton is sucked against the upper major surface of the support plate.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 4 is a side elevation of the conveyor module of FIG. 3;

FIG. 5 is a bottom view of the conveyor module of FIG. 3;

DESCRIPTION OF THE PREFERRED EMBODIMENT

Figure 1:
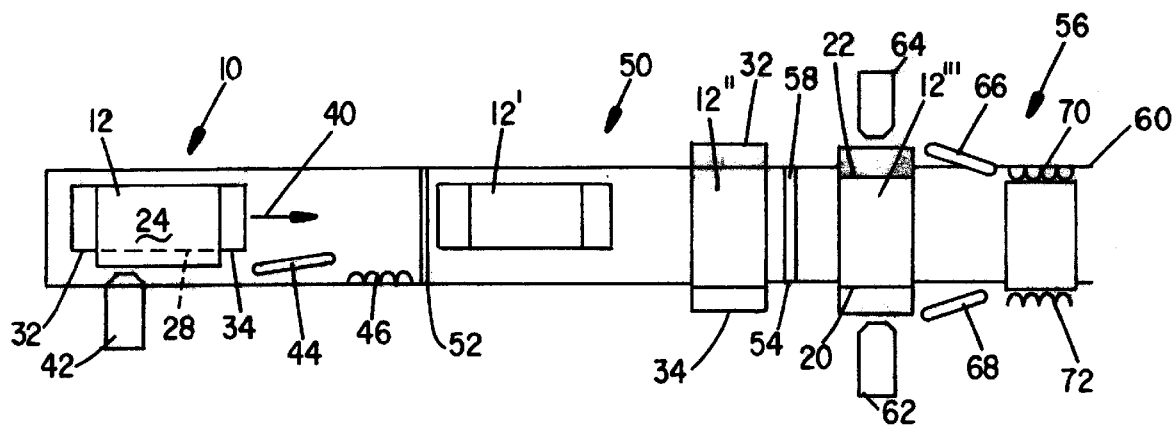
FIG. 1 is a diagrammatical illustration in plan view of a carton sealing system incorporating the conveyor module of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof Said terminology will include the words above specifically mentioned, derivatives thereof and words of similar import.

Before describing the details of the conveyor module comprising the preferred embodiment, it is deemed expedient to first explain the general purpose and use thereof and, in this regard, reference to FIGS. 1 and 2 will be made to provide definition of terms used herein and to provide an overview of the function of the present invention. In FIG. 1, reference numeral 10 identifies a first, upstream gluing station in which partially formed cartons, such as of the type indicated generally by numeral 12 in FIG. 2, are received from an infeed conveyor (not shown).

Figure 2:
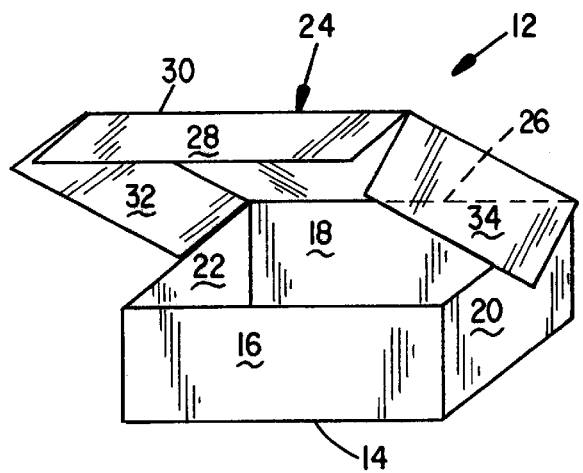
FIG. 2 is a perspective view of a carton in an early stage of fabrication.

With reference to FIG. 2, the carton is seen to comprise a folded paper board or cardboard box-like structure comprising a bottom wall 14 with mutually perpendicular side walls 16 and 18 and mutually perpendicular end walls 20 and 22. A lid 24 is hinged to the side wall 18 along fold line 26 and it includes a first tab portion 28 formed by folding the lid 24 along fold line 30. Each of the side edges of the lid 24 has a foldable extension tab that is to be glued to end walls 20 and 22. Specifically, the lid 24 has an extension tab 32 at its left end, when viewed in FIG. 2, and an extension tab 34 at its right end. Extension tab 32 is adapted to be folded inward against the end wall 22 and, similarly, the extension tab 34 is adapted to be folded inward against the box end wall 20.

Referring once more to FIG. 1, at the upstream gluing station 10, a carton, like that shown in FIG. 2, is being moved in the direction of arrow 40 by an overhead sweep conveyor (not shown). As it moves past a hot glue gun nozzle 42, a bead of glue is deposited on the side wall 16 and as the carton moves rightward, the extension tab 28 is made to engage a plow member 44 which causes the tab 28 to be folded and pressed against the bead of glue earlier deposited by the glue gun 42. The carton may be held in compression against the plow 44 by a resilient pad or spring 46 for a time sufficient for the hot glue to cool and bond the extension tab 28 to the outer surface of the side wall 16.

Disposed immediately down stream of the gluing station 10 is the conveyor module comprising the preferred embodiment of the present invention. It is identified generally by numeral 50 and, as will be further explained, receives the partially formed carton 12 from the upstream conveyor 10 and rotates the carton 90° in traveling from an inlet end 52 thereof to its outlet end 54. To illustrate the rotation feature, the carton 12' is shown to have its side walls 16 and 18 parallel to the direction of travel of the carton whereas as at a later time the carton, identified by numeral 12", is shown to have its end walls 20 and 22 parallel to the direction of travel.

Once the partially completed carton is rotated, it leaves the conveyor module 50 and is carried into the downstream gluing station, indicated generally by numeral 56. Again, an overhead sweep conveyor or a lugged chain conveyor of conventional design known in the packaging industry timed to the conveyor module 50 may be used to impart movement of the carton 12" from the inlet end 58 of the downstream gluing station 56 to its outlet end 60.

In traversing the gluing station 56, the carton 12" has a bead of glue injected by glue guns 62 and 64 onto the end panels 20 and 22 simultaneously. As the overhead conveyor (not shown) carries the cartons downstream away from the location of the glue guns, the tabs 32 and 34 engage plow members 66 and 68 which function to fold the tabs 32 and 34 against the adhesive surface and, subsequently, the tabs are held against the adhesive surface by resilient members 70 and 72 sufficiently long to permit the adhesive to solidify.

Having described the overall function of the system in which the conveyor module of the present invention finds use, the details of construction and mode of operation of the conveyor module 50 of FIG. 1 will next be presented.

Figure 3:
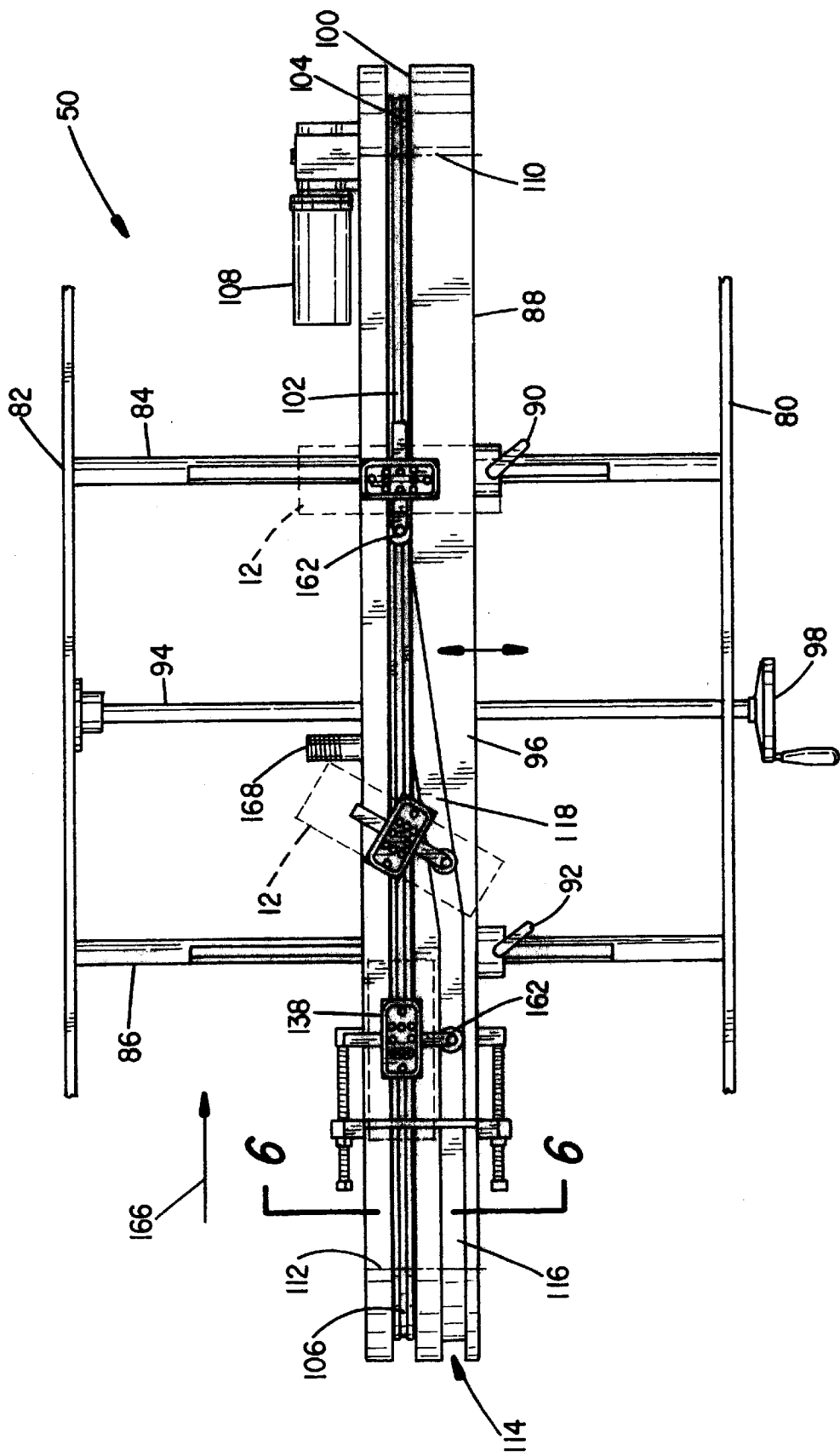
FIG. 3 is a top elevation of the carton rotating conveyor module constructed in accordance with a preferred embodiment of the present invention.
Figure 6:
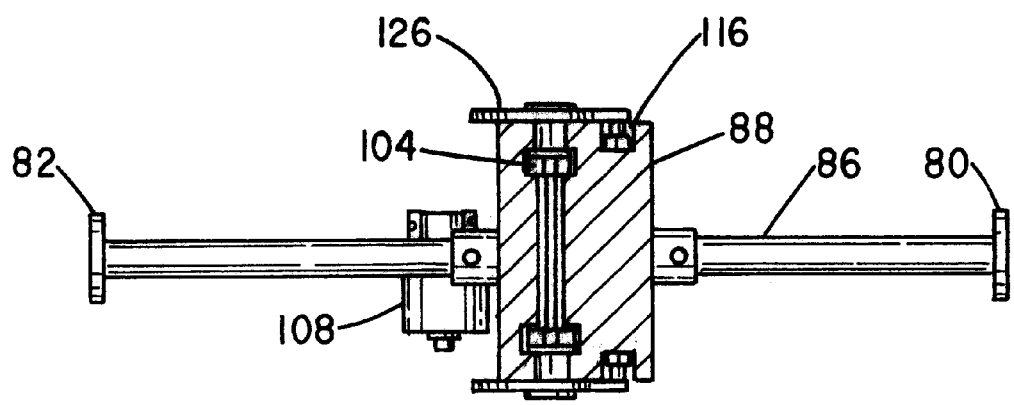
FIG. 6 is a cross-sectional view taken along the line 6—6 in FIG. 3.

Referring to FIG. 3, there is shown a top plan view of the conveyor module 50. It is seen to comprise a frame having side members 80 and 82 which are supported from the floor legs (not shown). Extending between the side members 80 and 82 of the frame are slide rails 84 and 86 which pass through transversely extending bores formed in a block member 88. Suitable bearings (not shown) may be disposed in the transversely extending bores to facilitate sliding of the block 88 to a desired position along the slide rails 84 and 86. Once a desired position of the block 88 is achieved during machine set-up to accommodate a carton of a given dimension, the block 88 can be locked in place relative to the frame by rotating the locking levers 90 and 92. To facilitate accurate positioning of the block member 88 between the side plates 80 and 82, a lead screw having a traveling nut 96 affixed to the block 88 is journaled for rotation between side plates 80 and 82. Rotation of the hand wheel 98 thus shifts the block 88 along the slide rails 84 and 86 in a direction determined by the direction of rotation of the hand wheel 98.

The block 88 includes a first longitudinal channel 100 in which is disposed an endless chain 102. The chain 102 is deployed about a driven sprocket 104 and an idler sprocket 106. The sprocket 104 is adapted to be driven by a motor 108. The sprocket wheels 104 and 106 are journaled for rotation relative to the frame about first and second horizontal, parallel, spaced-apart axes 110 and 112. The length of chain 102 above the axes 110 and 112 may be referred to as the upper chain flight and the length of the endless chain disposed below the axes 110 and 112 is referred to herein as the lower chain flight.

Referring again to the top view of FIG. 3, it can be seen that the block 88 includes a cam track 114 that can be considered to comprise a first segment 116 that is parallel to the upper chain flight over a first predetermined distance and a second segment 118 which is contiguous with the first segment but which converges toward the upper chain flight in the direction of travel of the upper chain flight. Referring to FIG. 5, which shows the underside of the block 88, in addition to the channel 100 in which the endless chain is disposed, it includes an additional cam track 120 that includes a first segment 122 that diverges away from the lower chain flight at a predetermined angle and is joined to a second segment 124 that extends parallel to the lower chain flight in the direction of travel of the lower chain flight.

Figure 7:
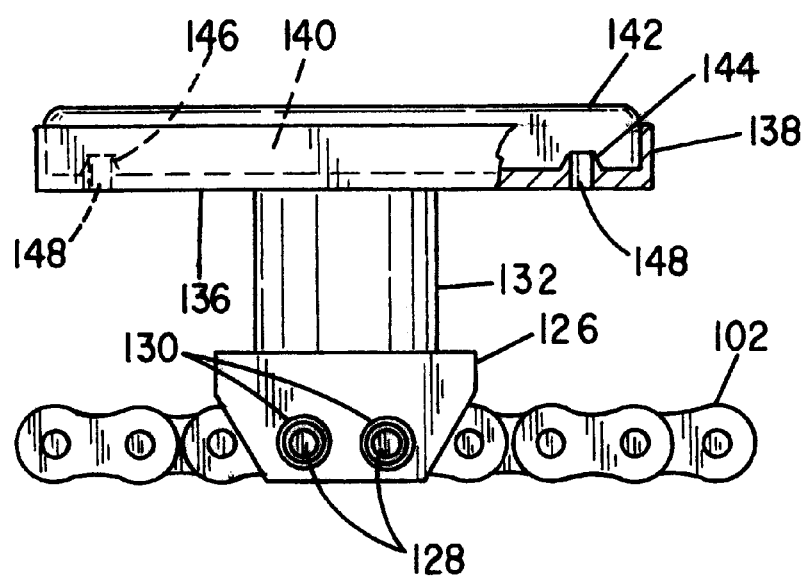
FIG. 7 is a partial view showing the pivotal attachment of the product support plate to the endless chain.
Figure 8:
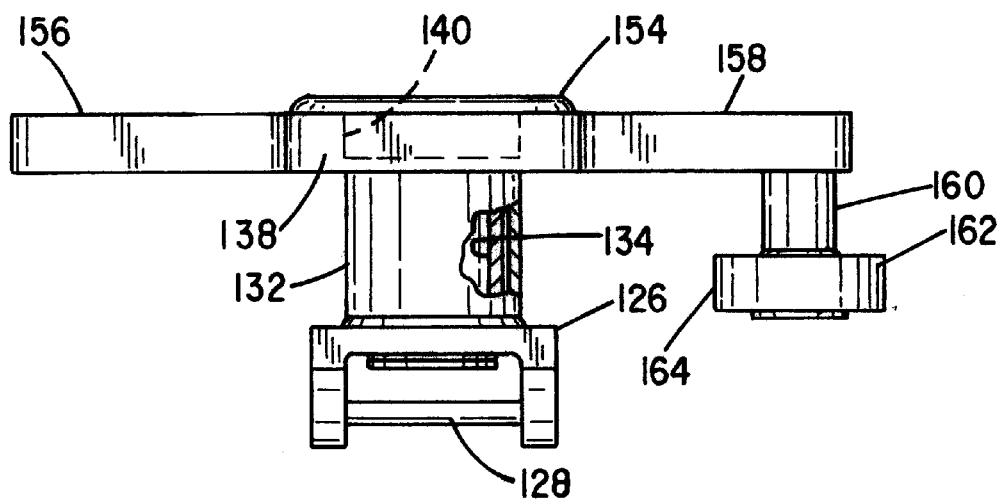
FIG. 8 is a partially sectioned side view of the product support plate and swivel mount.
Figure 9:
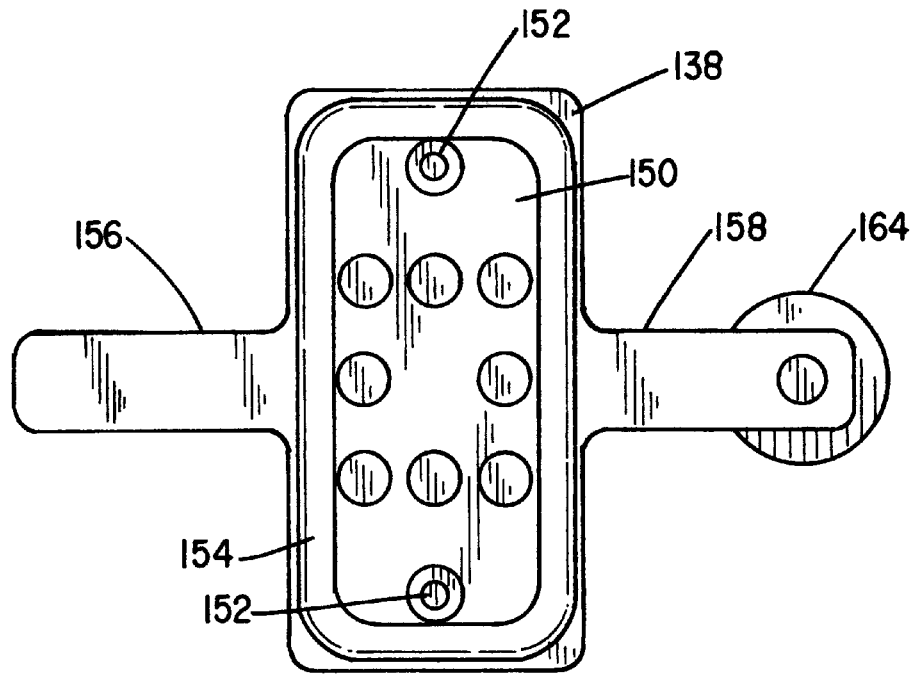
FIG. 9 is a top plan view of FIG. 8.

In FIG. 4 attached to the endless chain 102 is a plurality of product carriers 126, the details of which are illustrated in the views of FIGS. 7, 8 and 9.

As shown in FIG. 7, the chain 102 includes a coupler member 126 which is generally C-shaped and designed to straddle the chain 102. Chain link pins 128 pass through aligned apertures in the coupler 126 and in the chain links and a spring C-clip 130 is used to secure the link pins 128 in place.

Projecting perpendicularly from the upper surface of the coupling member 126 is a tubular post 132 having a I.D. dimensioned to provide a predetermined clearance fit with a tubular stub shaft 134 (FIG. 8) that projects downwardly from the undersurface 136 of a generally rectangular product support plate 138. The product support plate 138 includes a rectangular cavity 140 formed inwardly from the upper surface 142 thereof. Disposed within the cavity are first and second cylindrical pedestals 144 and 146 having threaded bores 148 formed therein. An apertured top plate 150 (FIG. 9) fits within the cavity 140 and rests on the pedestals 144 and 146. Screws 152 inserted into the threaded bores 148 hold the plate 150 in place. Because of the pedestals, the bottom surface of the plate 150 is spaced from the bottom of the product support plate 138 to create a vacuum plenum that is in fluid communication with the lumen of the tubular post 134. Thus, when a vacuum is drawn at the base of the tubular post 134, a suction is created through the apertures in the plate 150 to attract and hold a carton or other product onto the upper surface of the product support plate 138. It has also been found expedient to provide a gasket-type seal 154 in surrounding relation to the apertured plate 150 to inhibit leakage.

The product support plate 138 further includes laterally projecting arms 156 and 158 to provide additional support surface for a product being carried. As best seen in FIG. 8, a cylindrical stud 160 projects downward from the undersurface 136 of the arm 158 of the support plate 138 and affixed proximate the lower end of the stud 160 is a cam follower 162, which preferably comprises a ball bearing set having an outer race 164. The cam follower 162 depends from the arm 158 at a location that places the cam follower 162 in the cam track segment 116 which runs parallel to the endless chain 102. At this point, the longitudinal axis of the product support plate 138 is parallel to the chain axis. See FIG. 3.

As the chain carries the product support assembly in the direction of arrow 166, a point is reached where the cam track 114 begins its converging segment 118. In that the spacing between the cam track and the endless chain decreases, the product support plate 138 is forced to rotate until the point is reached in which the cam follower 162 now rides in the channel 100 of the block 88 carrying the chain 102. As can be seen in FIG. 3, the longitudinal axis of the support plate 138 is now transverse to the axis of the chain 102. This is a 90° rotation from the starting position.

Referring to FIG. 5, as each of the chain-mounted product carriers rounds the sprocket 104, a point is reached where the cam track begins to diverge away from the channel 100 carrying the chain. To ensure that the cam follower 162 will follow the cam track rather than the chain track, a permanent magnet 166 is affixed to the block 88 adjacent the diverging segment 122 of the cam track. The permanent magnet attracts the cam follower 162 which then enters the segment 122 and ultimately enters and traverses the parallel segment 124 so that when the carrier traverses the sprocket 106, it will again be positioned like the product support plate 138 closest to the left end of the conveyor module 50 shown in FIG. 3. Rather than using a permanent magnet to urge the cam follower into the diverging cam track segment, it is also possible to use an electromagnet air jet or a mechanical plunger to accomplish the same purpose.

With continued reference to FIG. 3, numeral 168 identifies a vacuum inlet to which a vacuum hose may be connected. This vacuum inlet leads through a bore in block 88 to the underside of the channel 100 in which the chain 102 resides. As the tubular stub shaft 134 enters the vacuum chamber, a suction is drawn through the apertures in the support plate 150, thus more firmly securing a product, such as a carton to the support plate as rotation occurs. The vacuum is released when the tubular stub shaft 134 leaves the vacuum chamber formed in the block 88 and, at this point, the product is picked up by a sweep conveyor (not shown) and transported through the gluing station 12''' (FIG. 1).

Figure 10:
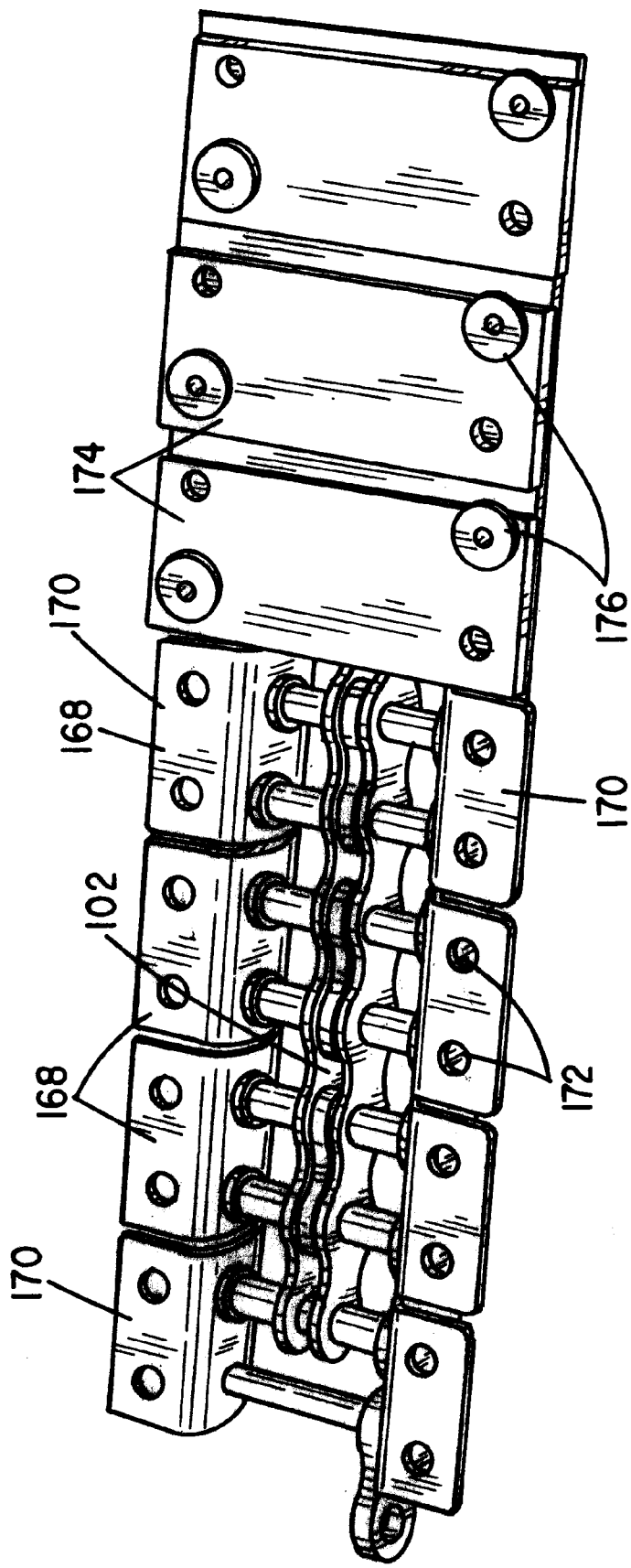
FIG. 10 is a detailed view of the chain assembly with cover plates for enhancing the vacuum presented to the product carrier assemblies.

In order to enhance the vacuum drawn through the apertures in the plate 138 as the product carriers are made to traverse the vacuum chamber in the block 88, it has been found expedient to provide overlapping covers on the individual links of the chain except in the those locations where the couplers 126 are attached to the chain. The drawing of FIG. 10 illustrates this feature. Here, the chain 102 has brackets 168 connected to each link. The brackets 168 include flanges 170 that are bent outwardly at 90° to the bracket wall and each of the flanges includes a pair of apertures as at 172. Plates 174, preferably formed from a plastic material exhibiting a low coefficient of friction are affixed to the flanges by pop rivets 176. The plates 174 overlap at their leading and trailing edges when the chain is moving in a horizontal direction, but do not interfere with one another as the chain traverses the sprockets 104 and 106.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. A conveyor module for rotating products while in transit along said conveyor module comprising:
   (a) a frame;
   (b) first and second sprocket wheels journaled for rotation relative to said frame about first and second horizontal, parallel, spaced-part axes, respectively;
   (c) an endless chain spanning the first and second sprocket wheels to define upper and lower chain flights;
   (d) a generally rectangular product support plate having upper and lower major surfaces, said support plate being affixed to a first shaft at a center point of the lower major surface and having a cam follower on a second shaft affixed to the lower major surface and laterally offset from the first shaft;
   (e) a coupler member secured to and carried by the chain and pivotally joined to the first shaft to permit rotation of the first shaft about a longitudinal axis of the first shaft; and
   (f) a cam track supported on the frame and including a first segment that is parallel to the upper chain flight over a first predetermined distance and a second segment which converges toward the upper chain flight in a direction of travel of the upper chain flight, said cam follower adapted to engage the cam track to cause rotation of the product support plate with the first shaft.

2. The conveyor module of claim 1 and further including:
   (a) an additional cam track supported on the frame and including a first segment diverging away from the lower chain flight at a predetermined angle andjoined to a second segment extending parallel to the lower chain flight in the direction of travel of the lower chain flight; and (b) means disposed adjacent the first segment of the additional cam track for causing the cam follower to traverse the first segment of the additional cam track.

3. The conveyor module of claim 2 wherein the means for causing the cam follower to traverse the first segment of the additional cam track exerts a magnetic force on the cam follower.

4. The conveyor module of claim 1 and further including a motor connected in drawing relation to one of said first and second sprocket wheels.

5. The conveyor module of claim 1 and further including means for drawing a vacuum through the product support plate for adhering a product to the upper major surface of the product support plate.

6. The conveyor module of claim 5 wherein the means for drawing a vacuum through the upper major surface of the product support plate includes a longitudinal bore extending through the first shaft, the bore being in fluid communication with a vacuum source; and the upper major surface of the support plate having a pattern of perforations therethrough.

7. A conveyor module for rotating products while in transit along said conveyor module comprising:

(a) a frame;

(b) an elongated block member of generally rectangular cross-section supported by the frame, the block member having upper and lower generally planar surfaces, the block having a longitudinal groove formed inwardly of the upper and lower planar surfaces, and first and second cam tracks, the first cam track having a first segment that is parallel to the longitudinal groove in the upper planar surface and second segment contiguous with and lead from the first segment to the longitudinal groove in the upper planar surface, the second cam track having a first segment that is parallel to the longitudinal groove formed inwardly of the lower surface and a second segment leading from the longitudinal groove formed inward of the lower surface to the first segment of the second cam track;

(c) first and second sprocket wheels journaled for rotation on said frame about first and second horizontal, parallel, spaced-part axes, respectively;

(d) an endless chain spanning the first and second sprocket wheels to define upper and lower chain flights, the upper chain flight disposed in the longitudinal groove formed inwardly of the upper surface and the lower chain flight disposed in the longitudinal groove formed inwardly of the lower surface;

(e) a generally rectangular product support plate having upper and lower major surfaces, said support plate being affixed to a first shaft at a center point of the lower major surface and having a cam follower on a second shaft affixed to the lower major surface and laterally offset from the first shaft;

(f) a coupler member secured to and carried by the chain and pivotally joined to the first shaft to permit rotation of the first shaft about a longitudinal axis of the first shaft when the cam follower traverses the second segments of the first and second cam tracks.

8. The conveyor module of claim 7 and further including means affixed to the lower surface of the block member for steering the cam follower from the longitudinal groove formed inward of the lower surface into the second segment of the second cam track as the product support plate is carried by the endless chain adjacent the lower surface of the block member.

9. The conveyor module of claim 8 wherein the means comprises a permanent magnet or an electromagnet.

* * * * *